(12) United States Patent
Bessho et al.

(10) Patent No.: US 8,451,577 B2
(45) Date of Patent: May 28, 2013

(54) LIGHTNING-RESISTANT FASTENER, CAP, FASTENER MEMBER, AND METHOD FOR ATTACHING LIGHTNING-RESISTANT FASTENER

(75) Inventors: Masahiro Bessho, Tokyo (JP); Wataru Nishimura, Tokyo (JP); Naomoto Ishikawa, Tokyo (JP); Yuichiro Kamino, Tokyo (JP); Toshikatsu Nohara, Tokyo (JP); Toru Hashigami, Aichi (JP); Tamaki Tsuzuki, Tokyo (JP)

(73) Assignee: Mitsubishi Aircraft Corporation, Nagoya-Shi (JP)

( * ) Notice: Subject to any disclaimer, the term of this patent is extended or adjusted under 35 U.S.C. 154(b) by 354 days.

(21) Appl. No.: 12/940,267

(22) Filed: Nov. 5, 2010

(65) Prior Publication Data

US 2011/0226896 A1     Sep. 22, 2011

(30) Foreign Application Priority Data

Nov. 6, 2009  (JP) .................................. 2009-255565

(51) Int. Cl.
*H05F 3/00* (2006.01)
(52) U.S. Cl.
USPC .......................................................... 361/218
(58) Field of Classification Search
USPC .......................................................... 361/218
See application file for complete search history.

(56) References Cited

U.S. PATENT DOCUMENTS

| | | | | |
|---|---|---|---|---|
| 3,897,712 A | * | 8/1975 | Black ............................. | 411/373 |
| 4,630,168 A | * | 12/1986 | Hunt ............................. | 361/218 |
| 4,755,904 A | * | 7/1988 | Brick ............................. | 361/117 |
| 4,905,931 A | * | 3/1990 | Covey ........................... | 244/1 A |
| 5,175,665 A | * | 12/1992 | Pegg ............................. | 361/218 |
| 2011/0226896 A1 | * | 9/2011 | Bessho et al. ................. | 244/1 A |
| 2012/0074257 A1 | * | 3/2012 | Bessho et al. ................. | 244/1 A |
| 2012/0155987 A1 | * | 6/2012 | Watanabe ...................... | 411/337 |
| 2012/0236457 A1 | * | 9/2012 | Yamakoshi et al. .......... | 361/218 |
| 2012/0250209 A1 | * | 10/2012 | Umemoto et al. ............ | 361/220 |

FOREIGN PATENT DOCUMENTS

JP          02-007398 A          1/1990

* cited by examiner

*Primary Examiner* — Ronald W Leja
(74) *Attorney, Agent, or Firm* — Pearne & Gordon LLP (57) ABSTRACT

A lightning-resistant fastener, a cap, a fastener member, and a method for attaching the lightning-resistant fastener are provided, which enhance workability and quality stability besides reliably securing an insulating property, and can lead to enhancement in safety of an airframe and reduction in manufacturing cost. A head portion 25b of a fastener main body 25 includes a head cap 50, and a shaft portion 25s of the fastener main body 25 includes a shaft cap 30, whereby a direct strike of lightning to a fastener member 24, and occurrence of an arc discharge from the fastener member 24 in the case of a lightning strike can be suppressed. A hole 52 is formed in the head cap 50, and a thread groove 52a is formed in the hole 52, whereby the head cap 50 can be reliably and easily positioned and attached to the fastener member 24.

14 Claims, 9 Drawing Sheets

PRIOR ART

FIG. 9B

PRIOR ART

LIGHTNING-RESISTANT FASTENER, CAP, FASTENER MEMBER, AND METHOD FOR ATTACHING LIGHTNING-RESISTANT FASTENER

BACKGROUND OF THE INVENTION

1. Field of the Invention

The present invention relates to a lightning-resistant fastener, a cap, a fastener member, and a method for attaching the lightning-resistant fastener, which are for use in an airframe of an aircraft.

2. Description of the Related Art

In various members such as a wing, landing gear including wheels composing the airframe of an aircraft, fastener members (fasteners) are used for attaching surface panels forming the surfaces of wings and landing gears, various devices and the like to structural members.

The fastener member fastens two members by inserting a pin-shaped fastener main body into through-holes formed in both of two members to be fixed to each other, and fixing a tip end portion thereof with a fixing metal fixture.

Incidentally, in an aircraft, all possible measures against a lightning strike need to be taken. Therefore, a direct lightning strike to fastener members needs to be avoided. Further, when two members fastened with the fastener member are formed from different materials, an arc discharge (spark) occurs in the direction along the interface between the two members due to a potential difference between the two members at the time of a lightning strike. Thus, occurrence of an arc discharge at the time of a lightning strike needs to be reliably suppressed.

Figure 9A:
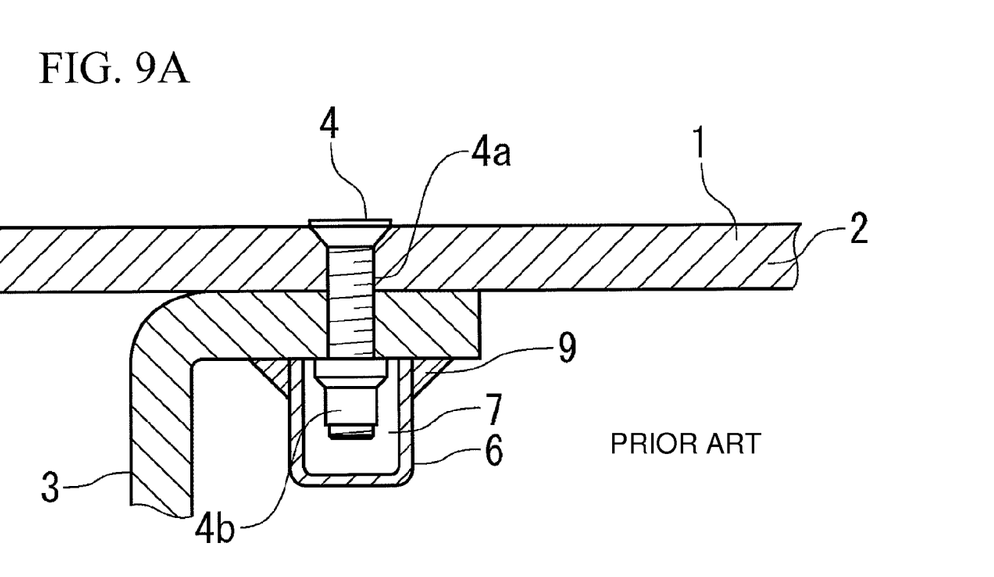
FIGS. 9A and 9B are sectional views showing examples of the conventional lightning-resistant fastener.
Figure 9B:
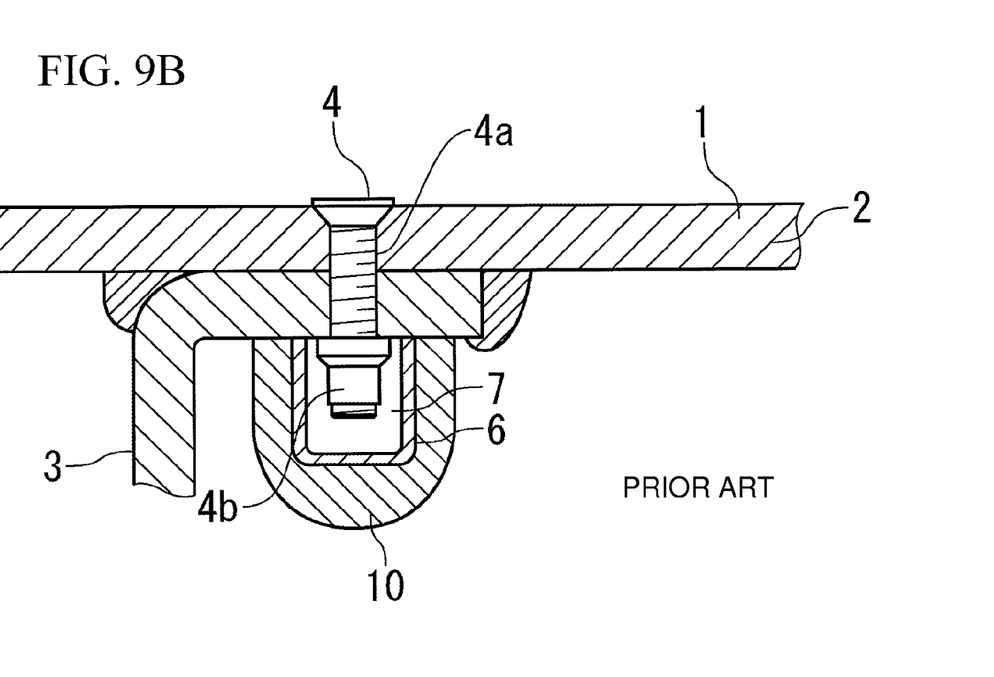

As shown in FIGS. 9A and 9B, the structure has been conventionally proposed, in which on an inner side of a wing 1 or the like, a cap 6 is attached in a state separated from a fastener main body 4a and a fixing metal fixture 4b of a fastener member 4 which penetrates through a first member 2 and a second member 3, and a gap 7 filled with air is formed between the fixing metal fixture 4b and the cap 6 (for example, refer to Japanese Patent Laid-Open No. 2-7398).

However, the art described in Japanese Patent Laid-Open No. 2-7398 does not provide the structure in which the cap 6 can be positioned with respect to the fastener member 4, and the attachment position of the cap 6 depends on a worker. Therefore, the center of the cap 6 and the center of the fastener member 4 are likely to be misaligned with each other. If a location arises, where a gap between the fastener member 4 and the cap 6 is small, in the air-gap 7, the function (lightning resistance) of the cap 6 reduces. If the cap 6 is attached in contact with the fastener member 4 in the worst case, the function itself of the cap 6 is likely to be seriously impaired.

Further, the cap 6 is attached to a second member 3 with an adhesive agent 9 as shown in FIG. 9A, or has an outer periphery covered with a rubber (insulating material) 10 as shown in FIG. 9B. Therefore, in the attaching site, a bonding work or a coating work of the rubber 10 is required, and the work requires much time and effort. In an aircraft, the work as described above has to be sometimes performed in the locations which have small spaces and are set far back, and workability is extremely low. In addition, such fastener members 4 are provided at several thousands to several tens of thousands spots, and therefore, reduction in workability directly leads to an increase in cost.

Furthermore, the work as described above is a so-called handwork, and the construction quality easily varies depending on a worker, which influences reliability.

Further, in the members which are not of a hollow structure, such as landing gears and ladders, both ends of the fastener member may be exposed outside the airframe, and in such a case, lightning resistance in both the ends of the fastener member needs to be secured.

SUMMARY OF THE INVENTION

The present invention is accomplished in view of such a technical problem, and has an object to provide a lightning-resistant fastener, a cap, a fastener member, and a method for attaching the lightning-resistant fastener which improve workability and quality stability besides reliably securing lightning resistance, and can lead to enhancement of safety of each part of an airframe, and reduction in manufacturing cost.

A lightning-resistant fastener of the present invention which is accomplished with such an object includes a fastener member for fastening a second member to a first member composing an airframe of an aircraft, and which has a shaft portion penetrating through the first member and the second member from a side of the first member to project to a side of the second member, a first cap which is attached to cover the shaft portion of the fastener member projected to the side of the second member, and is made of an insulating material, and a second cap which is attached to cover a head portion of the fastener member on the side of the first member, and is made of an insulating material. In the head portion of the fastener member, an engaging portion with which the second cap is engaged is formed on the side separated from the first member. The second cap has an engaged portion formed in a center portion on an inner peripheral surface thereof, and the engaged portion is engaged with the engaging portion. The second cap is attached to the fastener member in a state in which the engaged portion is engaged with the engaging portion while a gap is provided between the fastener member and a portion of the second cap other than the engaged portion. Like this, the engaging portion of the fastener member is engaged with the engaged member formed in the second cap, and thereby, the second cap can be easily and reliably positioned to the center and attached to the head portion of the fastener member. In this case, for the engaging portion and the engaged portion, a male screw and a female screw, a projected boss and a recessed portion corresponding to the projected boss, and the like can be arbitrarily used.

Further, an insulating sealant agent is preferably filled in the gap between the second cap and the fastener member.

The shaft portion of the fastener member, which is projected from the second member may be covered with the first cap by any constitution. However, it is preferable that a second engaging portion is formed on the shaft portion of the fastener member, the first cap has a second engaged portion formed in a center portion of an inner peripheral surface thereof, and which is engaged with the second engaging portion of the fastener member. The first cap is attached in a state in which the second engaging portion of the fastener member is engaged with the second engaged portion while a gap is provided between the fastener member and a portion of the first cap other than the second engaged portion.

A groove along a direction away from the first member is preferably formed in the engaged portion or the engaging portion. Thereby, when the engaging portion of the fastener member is engaged with the engaged portion of the second cap, the excessive amount of the sealant agent filled in the gap between the second cap and the fastener member can be forced out through the groove.

When the engaged portion and the engaging portion are of a screw type, a head portion of the second cap may have a shape on which a tool for screwing the second cap into the fastener member can be laid, and if a worker manually turns the second cap, anti-slip work is preferably applied onto an outer peripheral surface of the second cap.

Further, a knob portion for a worker to turn the second cap manually may be formed to project from the second cap. At this time, if the knob portion is connected to the second cap via a connecting portion, and the connecting portion is twisted off when the second cap is screwed into the shaft portion of the fastener member by pinching the knob portion, and fastening torque thereof reaches a predetermined level, the fastening torque of the second cap can be easily controlled.

The inner peripheral surface of the second cap is preferably formed so that an inside diameter thereof gradually decreases toward a side where the engaged portion is formed from an opening end side opposite from the side where the engaged portion is formed. Thereby, when the sealant agent is filled inside the second cap, an air-gap can be suppressed from being formed in the sealant agent. Further, when an impact or the like is applied to the second cap, only the second cap falls off, and the sealant agent can still remain in the shaft portion of the fastener member as it is.

Further, on the opening end side of the second cap, a thickness of the sealant agent in a direction of a diameter of the second cap is preferably set at a predetermined dimension or more. Thereby, when the second cap falls off, lightning-resistant performance can be secured by only the sealant agent.

The adhesive strength between the second cap and the sealant agent may be smaller than the adhesive strength between the sealant agent and the fastener member. Thereby, when an impact or the like is applied to the second cap, only the second cap falls off, and the sealant agent can still remain in the head portion of the fastener member as it is.

The present invention provides a cap that is fitted onto a head portion of a fastener member which fastens a first member and a second member. The cap is made of an insulating material and umbrella-shaped. The cap has an engaged portion on an inner peripheral surface of a top portion of the cap, and the engaged portion is engaged with the head portion of the fastener member on the side of the first member is formed. The cap is attached in a state in which the engaged portion is engaged with the head portion of the fastener member while a gap is provided between the fastener member and a portion of the cap other than the engaged portion. Such a cap can be applied to not only the member composing the airframe of an aircraft as described above, but also to a fastener member for use in joint of members in the other uses.

The present invention provides a fastener member made of a conductive material for fastening a second member to a first member composing an airframe of an aircraft. The fastener comprises a shaft portion which penetrates through the first member and the second member from a side of the first member, and projects to a side of the second member, a head portion which has a diameter larger than the shaft portion and is exposed to the side of the first member, and an engaging portion for engaging with and attaching a cap made of an insulating material to cover the head portion of the fastener member. The engaging portion is formed at the head portion and on the side away from the second member.

Further, the engaging portion comprises a boss projected to a side away from the first member, and any one of a thread groove, a groove continuing in a circumferential direction and a protruded ridge, which are formed on an outer peripheral surface of the boss.

The present invention also provides a method for attaching a lightning-resistant fastener, including the steps of penetrating a fastener main body from a side of a first member in a state in which the first member composing an airframe of an aircraft and a second member are laid on each other, fitting a fixing metal fixture to the fastener main body from a side of the second member, attaching a first cap to cover the fastener main body and the fixing metal fixture, on the side of the second member, and attaching a second cap to a head portion of the fastener main body, on the side of the first member.

Further, it may further include the step of filling a sealant agent made of an insulating material in the inner peripheral side of the cap prior to attaching the second cap to the head portion of the fastener main body.

According to the present invention, the cap can be attached to the head portion of the fastener member which fastens the first member and the second member with stable quality irrespective of a worker, while workability is improved, and manufacturing cost is suppressed besides reliably securing lightning resistance.

Further, by filling the insulating sealant agent in the gap between the cap and the fastener member, lightning resistance, and the sealing performance of the fastener member to a fuel can be secured.

DETAILED DESCRIPTION OF THE PREFERRED EMBODIMENT

Hereinafter, the invention will be described in detail based on the embodiments shown in the accompanying drawings.

Figure 1:
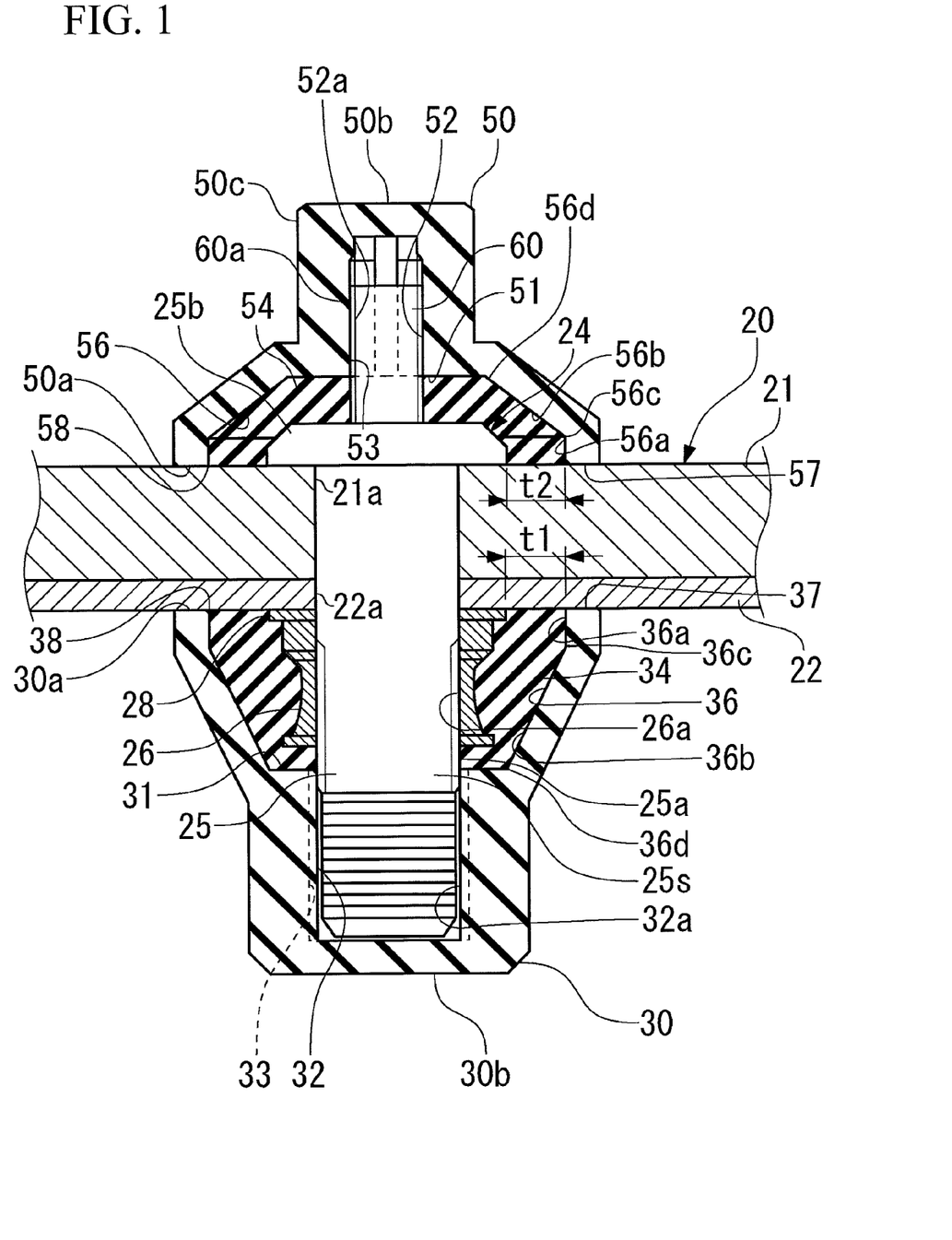
FIG. 1 is a sectional view showing a lightning-resistant fastener in the present embodiment.

FIG. 1 is a sectional view of a part of an airframe composing member 20 such as wings, landing gears, ladders and the like composing an airframe of an aircraft to which a lightning-resistant fastener, a cap, and a method for attaching the lightning-resistant fastener in the present embodiment are applied.

As shown in FIG. 1, a first member 21 and a second member 22 which compose the airframe composing member 20 are fastened by a fastener member 24. In this case, as the first member 21 and the second member 22, the combinations of a surface panel forming a surface of the airframe composing member 20 and a structural member holding the surface panel, and the structural member and brackets or the like for holding various devices attached to the structural member are conceivable. Other combinations of two members may be adopted as a matter of course.

The fastener member 24 comprises a pin-shaped fastener main body 25, a collar 26 fitted to the fastener main body 25 on the side of the second member 22, and a washer 28.

The fastener main body 25 and the collar 26 are generally made of a metal material from the viewpoint of strength.

The pin-shaped fastener main body 25 has a thread groove (second engaging portion) 25a formed in a shaft portion 25s, and a head portion 25b has a larger diameter than the shaft portion 25s. The fastener main body 25 has the shaft portion 25s inserted into holes 21a and 22a which are formed by penetrating through the first member 21 and the second member 22 from the side of the first member 21. The shaft portion 25s projects to the side of the second member 22 in a state in which the head portion 25b is butted to the periphery of the hole 21a of the first member 21.

The collar 26 is cylindrical, and has a thread groove 26a in an inner peripheral surface thereof. The thread groove 26a meshes with the thread groove 25a of the fastener main body 25. The collar 26 is screwed into the thread groove 25a of the fastener main body 25 which is projected to the side of the second member 22. Thereby, the first member 21 and the second member 22 are inserted between the head portion 25b of the fastener main body 25, and the collar 26 and the washer 28, and the second member 22 and the first member 21 are fastened.

In this state, the shaft portion 25s of the fastener main body 25 is projected to the side away from the second member 22 past the collar 26, and the thread groove 25a is exposed from the collar 26 by a constant length.

The washer 28 is in a ring-shape having a predetermined thickness, is sandwiched between the collar 26 and the second member 22, and is made of an insulating material such as polyimide, for example. The washer 28 made of an insulating material prevents an arc discharge from occurring in the interface between the second member 22 and the washer 28.

A shaft cap (first cap) 30 is fitted onto the fastener member 24 on the side of the second member 22, and a sealant agent 34 having an insulating property is filled inside the shaft cap 30.

Figure 2A:
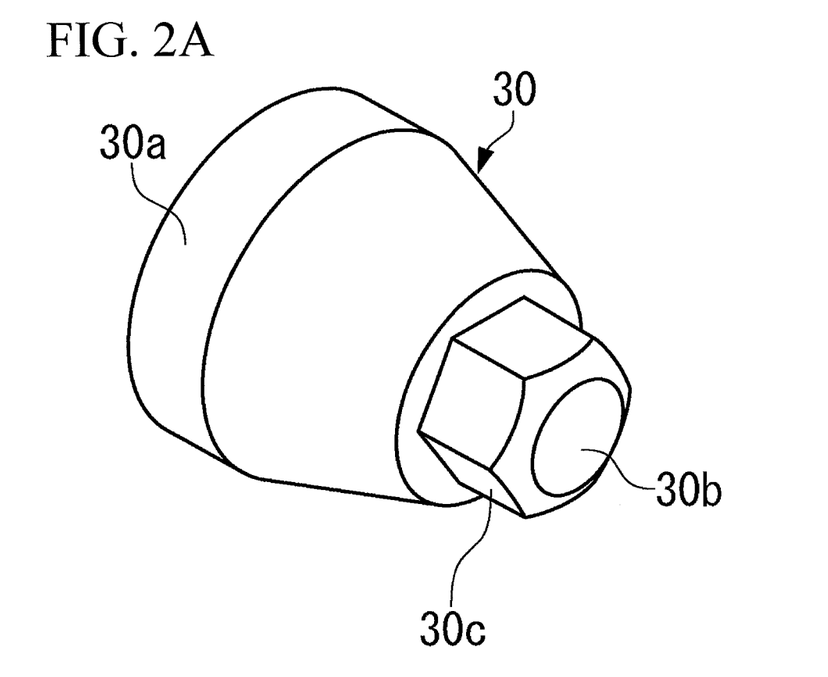
FIGS. 2A and 2B are perspective views of a cap.
Figure 2B:
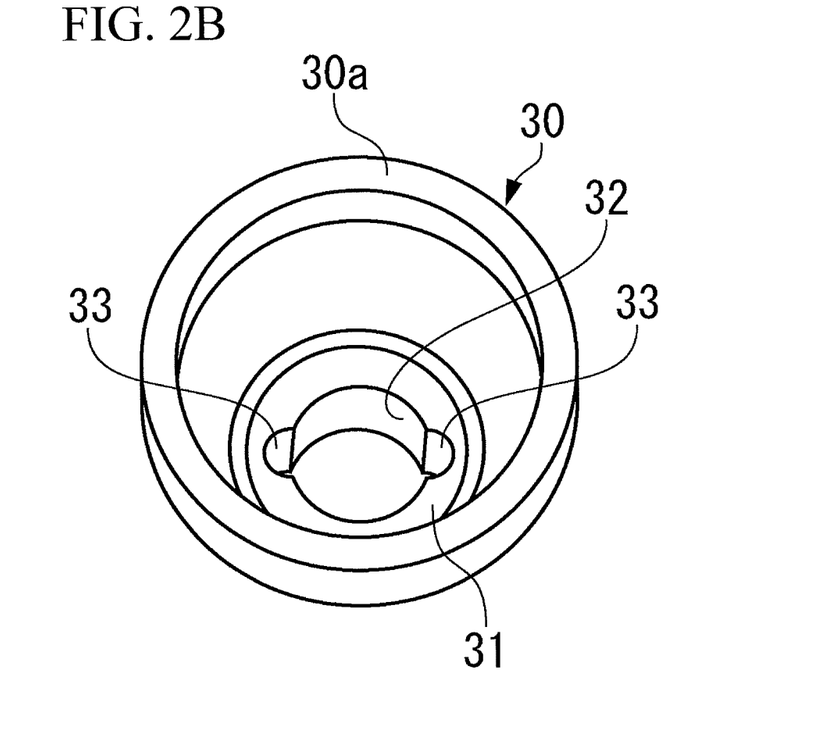
Figure 3:
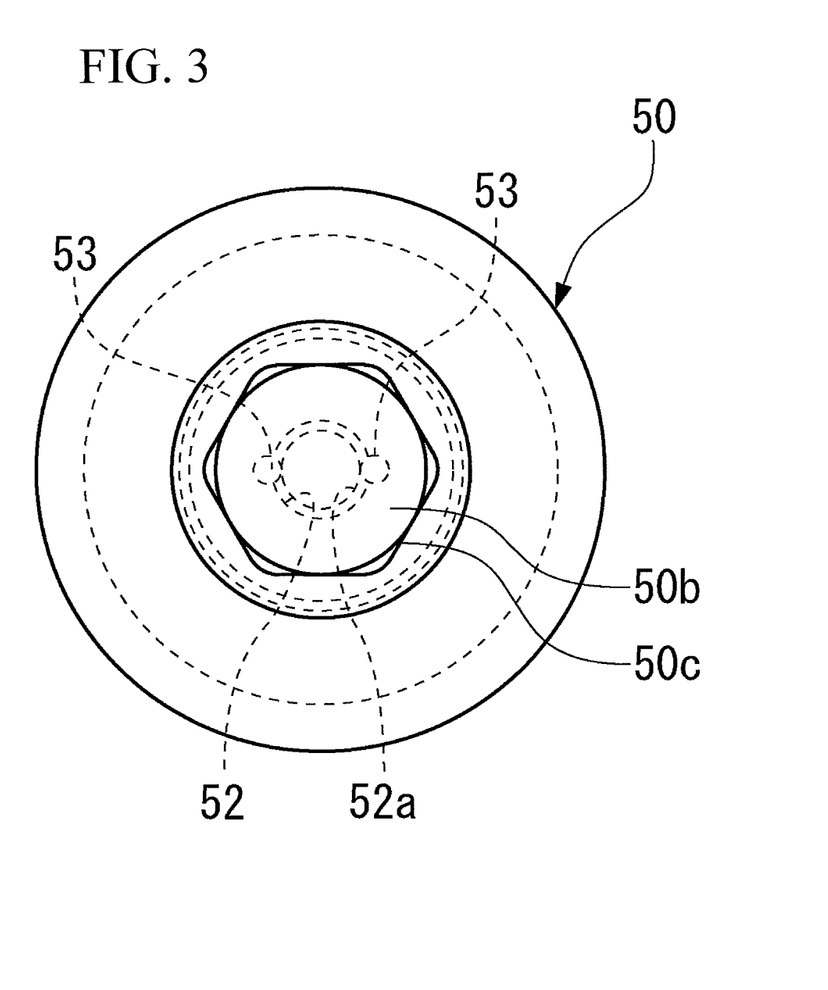
FIG. 3 is a plane view of a head cap.

As shown in FIGS. 2A, 2B and 3, the shaft cap 30 is circular in section, opens on only one end portion 30a side, and is in an umbrella shape with its inside diameter and outside diameter gradually reducing toward the side of the other end portion 30b. The cap is preferably made of a resin having an insulating property, such as PPS (polyphenylene sulfide resin), polyimide, PEEK (polyether ether ketone resin), and a nylon resin.

A bottomed hole (second engaged portion) 32 circular in section is formed in an inner peripheral surface (hereinafter, this will be called a bottom surface 31) on the side of the other end portion 30b of the shaft cap 30. A thread groove 32a which meshes with the thread groove 25a of the fastener main body 25 is formed in the inner peripheral surface of the hole 32. In the shaft cap 30, the shaft portion 25s of the fastener main body 25 is inserted into the hole 32 while the end surface of the one end portion 30a is pressed against the second member 22. At this time, the thread groove 32a of the shaft cap 30 meshes with the thread groove 25a of the fastener main body 25, whereby the shaft cap 30 can be easily and reliably positioned and fixed to the fastener member 24.

In such a shaft cap 30, the inside diameter of an inner peripheral surface 36 is set so that predetermined gaps are formed between the shaft cap 30, and the washer 28, the fastener main body 25 and the collar 26 when the shaft cap 30 is fitted onto the fastener member 24. The shaft cap 30 is formed so as to be able to secure a gap of a predetermined dimension t1 or more between the inner peripheral surface 36 of the shaft cap 30, and the washer 28 and the fastener main body 25 especially in the one end portion 30a which is on the open side of the shaft cap 30.

In the state in which the shaft cap 30 is fitted onto the fastener member 24, the sealant agent 34 having an insulating property is filled inside the shaft cap 30. The sealant agent 34 is interposed between the inner peripheral surface of the shaft cap 30, and the fastener main body 25 and the collar 26, and thereby the insulating property between the shaft cap 30 and the fastener member 24 is further increased. In the one end portion 30a which is on the open side of the shaft cap 30, the sealant agent 34 between the inner peripheral surface 36 of the shaft cap 30, and the washer 28 and the fastener main body 25 has a thickness of the predetermined dimension t1 or more. Therefore, the insulating performance in the interfaces between the sealant agent 34 and the inner peripheral surface 36 of the shaft cap 30, and the interfaces between the sealant agent 34 and the washer 28 and the fastener main body 25 is secured.

Further, the inner peripheral surface 36 of the shaft cap 30 comprises, on the one end portion 30a side, a straight portion 36a with its inside diameter being constant, and a taper portion 36b with its inside diameter gradually reducing toward the hole 32 from the straight portion 36a.

A corner portion 36c where the straight portion 36a and the taper portion 36b are adjacent to each other, and a corner portion 36d where the taper portion 36b and the bottom surface 31 are adjacent to each other are formed in R shapes having predetermined curvature radiuses.

In this manner, the inner peripheral surface 36 of the shaft cap 30 is formed into a surface which smoothly continues from the straight portion 36a to the corner portion 36c, the taper portion 36b and the corner portion 36d. Thereby, when the sealant agent 34 is filled in the shaft cap 30, air is prevented from being wrapped in the sealant agent 34, and an air-gap is prevented from being formed in the sealant agent 34 in the inner peripheral surface 36 (especially in the corner portions 36c, 36d and the like).

Meanwhile, the head portion 25b of the above described fastener main body 25 is covered with the head cap (second cap) 50, and a sealant agent 54 filled in the head cap 50, whereby a lightning strike is prevented, and an electric current is prevented from concentrating on the fastener member 24 at the time of a lightning strike.

A columnar boss (engaging portion) 60 which projects in the direction away from the first member 21 is formed at the head portion 25b of the fastener main body 25. A thread groove 60a is formed on the outer peripheral surface of the boss 60.

Meanwhile, similar to the shaft cap 30, the head cap 50 is circular in section, is opened at only one end portion 50a side, and is formed into an umbrella shape with an inside diameter and an outside diameter thereof gradually reducing toward the other end portion 50b side. The head cap 50 is preferably made of a resin having an insulating property such as a PPS, polyimide, PEEK, and nylon resin.

A bottomed hole (engaged portion) 52 circular in section is formed in an inner peripheral surface (hereinafter, this will be called a bottom surface 51) on the side of the other end portion 50b (side away from the first member 21) of the head cap 50. A thread groove 52a which meshes with the thread groove 60a of the boss 60 is formed in the inner peripheral surface of the hole 52. In the head cap 50, the boss 60 is inserted into the hole 52 with the end surface of the one end portion 50a pressed against the first member 21. At this time, the thread groove 52a of the head cap 50 meshes with the thread groove 60a of the boss 60, whereby the head cap 50 can be easily and reliably positioned and fixed to the fastener member 24.

In such a head cap 50, the inside diameter of an inner peripheral surface 56 is set so that predetermined gaps are formed between the head cap 50, and the head portion 25b of the fastener main body 25, when the head cap 50 is fitted onto the fastener member 24. The head cap 50 is formed so as to be able to secure a gap of a predetermined dimension t2 or more between the inner peripheral surface 56 of the head cap 50 and the head portion 25b of the fastener main body 25 especially in the one end portion 50a which is on the open side of the head cap 50.

In the state in which the head cap 50 is fitted onto the fastener member 24, the sealant agent 54 having an insulating property is filled inside the head cap 50. The sealant agent 54 is interposed between the inner peripheral surface 56 of the head cap 50, and the head portion 25b of the fastener main body 25, and thereby the insulating property between the head cap 50 and the fastener member 24 is further increased. In the one end portion 50a which is on the open side of the head cap 50, the sealant agent 54 between the inner peripheral surface 56 of the head cap 50, and the head portion 25b of the fastener main body 25 has a thickness of the predetermined dimension t2 or more. Therefore, the insulating performance in the interface between the sealant agent 54 and the inner peripheral surface 56 of the head cap 50 and the interface between the sealant agent 54 and the head portion 25b of the fastener main body 25 is secured.

Further, the inner peripheral surface 56 of the head cap 50 comprises, on the side of the one end portion 50a, a straight portion 56a with its inside diameter being constant and a taper portion 56b with its inside diameter gradually reducing toward the bottom surface 51 from the straight portion 56a.

A corner portion 56c where the straight portion 56a and the taper portion 56b are adjacent to each other, and a corner portion 56d where the taper portion 56b and the bottom surface 51 are adjacent to each other are formed into R shapes having predetermined curvature radiuses.

In this manner, the inner peripheral surface 56 of the head cap 50 is formed into a surface which smoothly continues from the straight portion 56a to the corner portion 56c, the taper portion 56b and the corner portion 56d. Thereby, when the sealant agent 54 is filled into the head cap 50, air is prevented from being wrapped in the sealant agent 54, and an air-gap is prevented from being formed in the sealant agent 54 in the inner peripheral surface 56 (especially in the corner portions 56c, 56d and the like).

When the shaft cap 30 and the head cap 50 are fitted onto the fastener member 24 which fastens the first member 21 and the second member 22, the uncured sealant agents 34 and 54 are filled inside the shaft cap 30 and the head cap 50. Subsequently, the shaft cap 30 and the head cap 50 are pressed against the fastener main body 25 of the fastener member 24 which is projected from the first member 21 and the second member 22.

At this time, the sealant agent 34 which is filled in the shaft cap 30 overflows from the opening of the one end portion 30a of the shaft cap 30 and the sealant agent 54 which is filled in the head cap 50 overflows from the opening of the one end portion 50a of the head cap 50. The sealant agents 34 and 54 preferably overflow from the entire peripheries of the shaft cap 30 and the head cap 50 so that the sealant agents 34 and 54 uniformly spread into the entire areas inside the shaft cap 30 and the head cap 50. Therefore, surfaces 37 and 57 of the one end portions 30a and 50a of the shaft cap 30 and the head cap 50 are preferably smooth surfaces, and inner peripheral edge portions 38 and 58 of the one end portions 30a and 50a are preferably formed so that a burr, flash and the like do not occur.

When the shaft cap 30 and the head cap 50 are pressed against the fastener main body 25, the fastener member 24 can be reliably and easily positioned to the centers of the shaft cap 30 and the head cap 50, because the holes 32 and 52 are formed inside the shaft cap 30 and the head cap 50. Thereby, the shaft cap 30 and the head cap 50, and the fastener member 24 are prevented from being misaligned with each other, and the gap between the shaft cap 30 and the fastener member 24 and the gap between the head cap 50 and the fastener member 24 do not become narrow depending on the locations, so that the fastener member 24 can be prevented from directly contacting the shaft cap 30 and the head cap 50.

In order to facilitate positioning of the shaft cap 30 and the head cap 50 to the fastener member 24, it is effective to form the peripheral edge portions of the holes 32 and 52 into taper surfaces with their inside diameters gradually reducing toward the back sides of the holes 32 and 52.

After the holes 32 and 52 of the shaft cap 30 and the head cap 50 are pressed against the fastener main body 25, the shaft cap 30 and the head cap 50 are rotated to be screwed into the fastener main body 25.

At this time, if the sealant agents 34 and 54 are filled in the holes 32 and 52 respectively, the shaft portion 25s of the fastener main body 25 and the boss 60 sometimes cannot be inserted into predetermined depths of the holes 32 and 52. This is because the sealant agents 34 and 54 inside the holes 32 and 52 have nowhere to go when the shaft portion 25s of the fastener main body 25 and the boss 60 are inserted into the holes 32 and 52, and the fastener main body 25 enters the holes 32 and 52 as the shaft cap 30 and the head cap 50 are screwed in, and the pressure of the sealant agents 34 and 54 become high.

Thus, grooves 33 and 53 which extend along the center axis direction (direction away from the second member 22) of the holes 32 and 52 are preferably formed at least in one location on the inner peripheral surfaces of the holes 32 and 52 of the shaft cap 30 and the head cap 50. In the examples of FIGS. 2B and 3, the two grooves 33 and the two grooves 53 are formed in the holes 32 and 52 respectively. Three or more of the grooves 33 and 53 can be formed as a matter of course.

As a result that the grooves 33 and 53 are thus formed in the holes 32 and 52, the excessive sealant agents in the holes 32 and 52 are forced out of the holes 32 and 52 through the grooves 33 and 53 as the shaft portion 25s of the fastener main body 25 and the boss 60 are inserted into the holes 32 and 52. Thereby, the air-gaps are prevented from remaining in the sealant agents 34 and 54 in the holes 32 and 52, and insertion of the fastener main body 25 into the holes 32 and 52, that is, attachment of the shaft cap 30 and the head cap 50 to the fastener member 24 can be easily performed.

After the shaft cap 30 and the head cap 50 are screwed in until the end surfaces of the one end portions 30a and 50a of the shaft cap 30 and the head cap 50 are pressed against the second member 22 and the first member 21 respectively, screwing of the shaft cap 30 and the head cap 50 is completed. Subsequently, in this state, the thread groove 25a formed in the fastener main body 25 meshes with the thread groove 32a of the hole 32 of the shaft cap 30 and the thread groove 60a of the boss 60 meshes with the thread groove 52a of the hole 52 of the head cap 50, whereby the shaft cap 30 and the head cap 50 are reliably fixed to and held by the fastener member 24.

Further, when the filled sealant agents 34 and 54 are cured, the sealant agents 34 and 54 also exhibit the effect of fixing the shaft cap 30 and the head cap 50 to the fastener member 24.

The fastener member 24 onto which the shaft cap 30 and the head cap 50 are thus fitted is a lightning-resistant fastener.

The shaft cap 30 and the head cap 50 may fall off due to the impact or the like in the case of something colliding with the outer peripheral surfaces of the shaft cap 30 and the head cap 50. Even in such a case, it is preferable that the head portion of the fastener main body 25 is covered with the sealant agents 34 and 54 is kept without the cured sealant agents 34 and 54 falling off with the shaft cap 30 and the head cap 50.

For this purpose, the material of the sealant agents 34 and 54 is preferably selected so that the adhesive force between the shaft cap 30 and the sealant agent 34 becomes weaker than the adhesive force of the sealant agent 34 and the fastener member 24, and the adhesive force between the head cap 50 and the sealant agent 54 becomes weaker than the adhesive force between the sealant agent 54 and the fastener member 24. If the adhesive force between the shaft cap 30 and the sealant agent 34 is weaker than the adhesive force between the sealant agent 34 and the fastener member 24 and the adhesive force between the head cap 50 and the sealant agent 54 is weaker than the adhesive force between the sealant agent 54 and the fastener member 24, the shaft cap 30 and the head cap 50 remove from the sealant agents 34 and 54, and only the shaft cap 30 and the head cap 50 fall off when an impact or the like is applied to the shaft cap 30 and the head cap 50, and the fastener member 24 keeps the state covered with the sealant agents 34 and 54. Therefore, the lightning-resisting performance can be kept.

Incidentally, a worker may screw the head cap 50 by using a tool, or may screw it manually.

For example, when a worker screws the head cap 50 by a tool, the head portion 50c of the other end portion 50b of the head cap 50 may be formed into a polygonal shape such as a hexagonal shape, and a hexagonal hole shape corresponding to the tool shape, as shown in FIG. 3.

Figure 4:
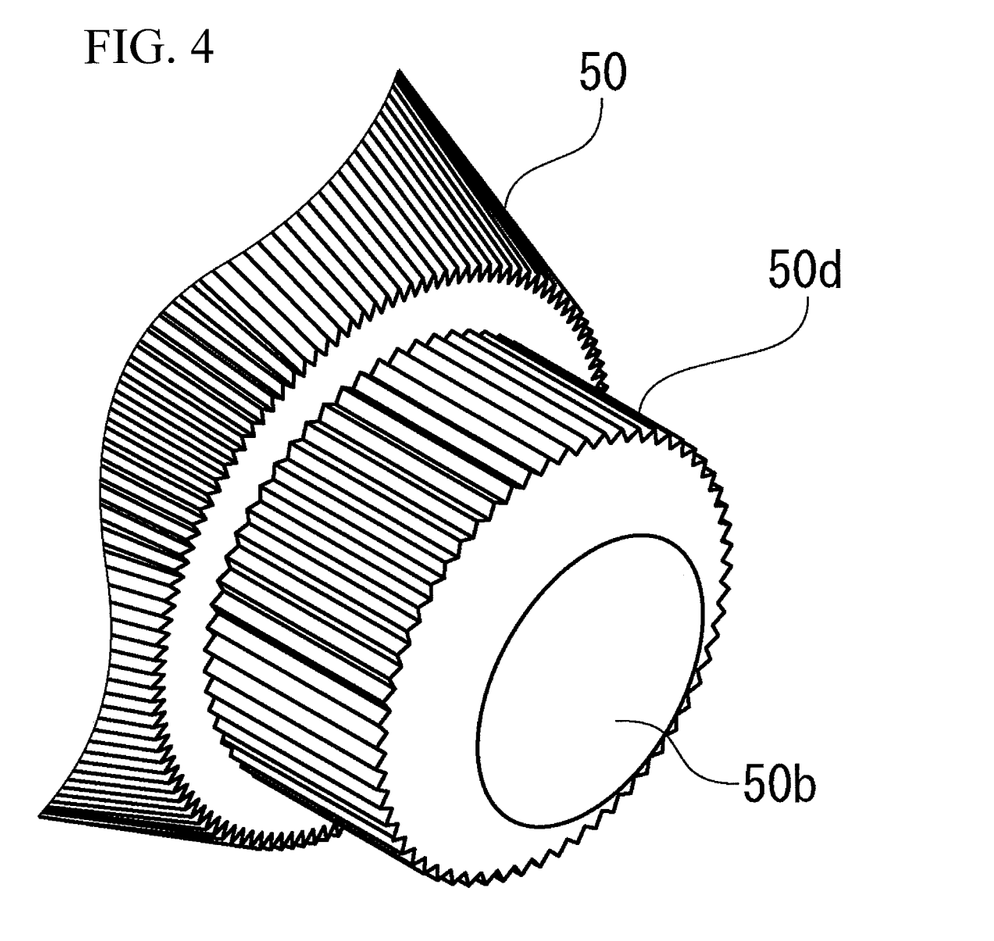
FIG. 4 is a view showing an example of applying slit machining to an outer peripheral surface of the cap.
Figure 5:
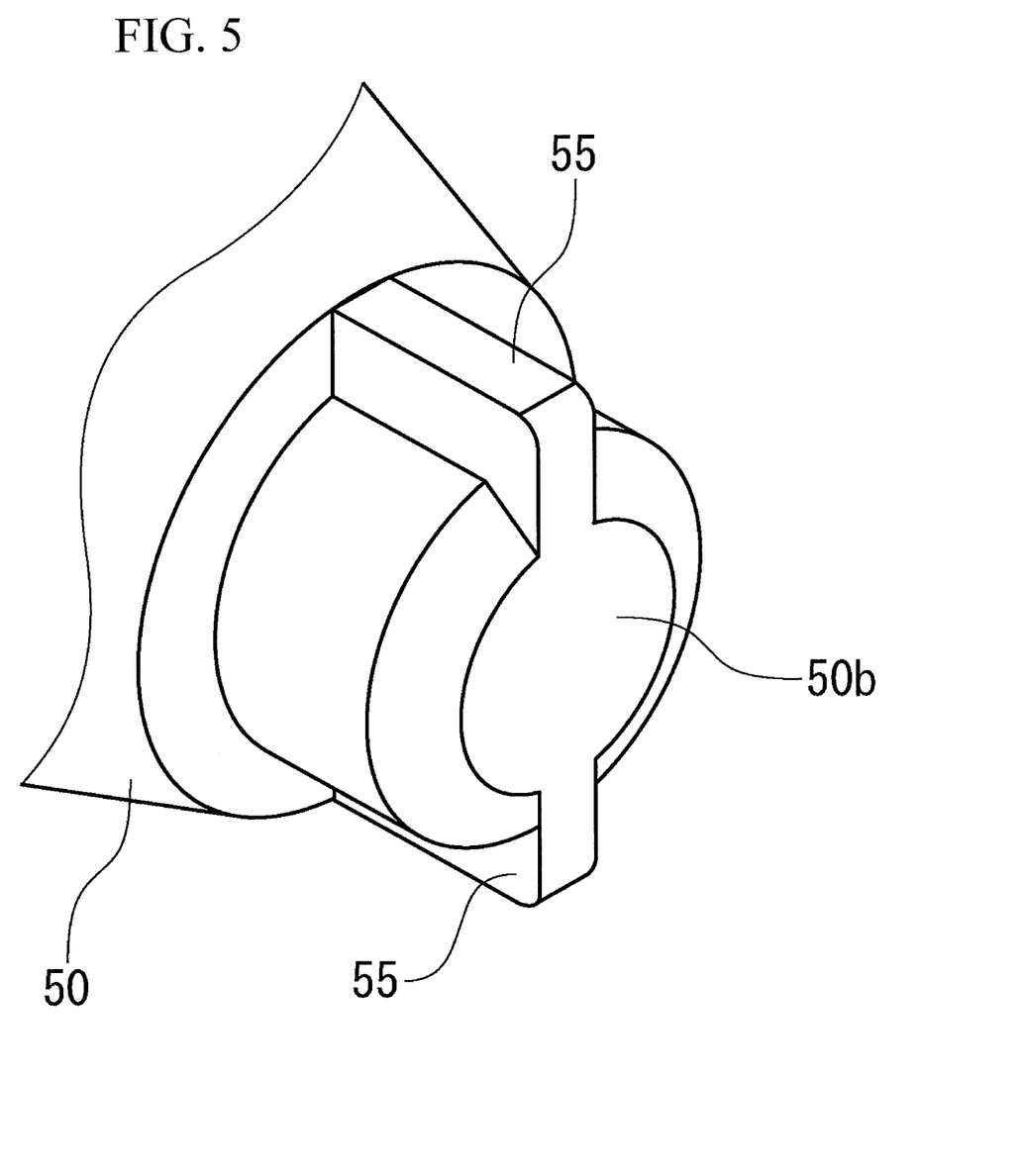
FIG. 5 is a view showing an example of providing projections at a head portion of the cap.

Further, as shown in FIG. 4, when a worker manually screws the head cap 50, slit machining, knurling, diamond cutting or the like is applied to at least a part of the outer peripheral surface 50d of the head cap 50, and thereby, slip resistance can be made. Further, as shown in FIG. 5, projections 55 may be formed at a plurality of spots (two spots or more) at the other end portion 50b of the head cap 50 with spacing in the circumferential direction between them. The number, the shape and the like of the projections 55 do not matter.

Figure 6:
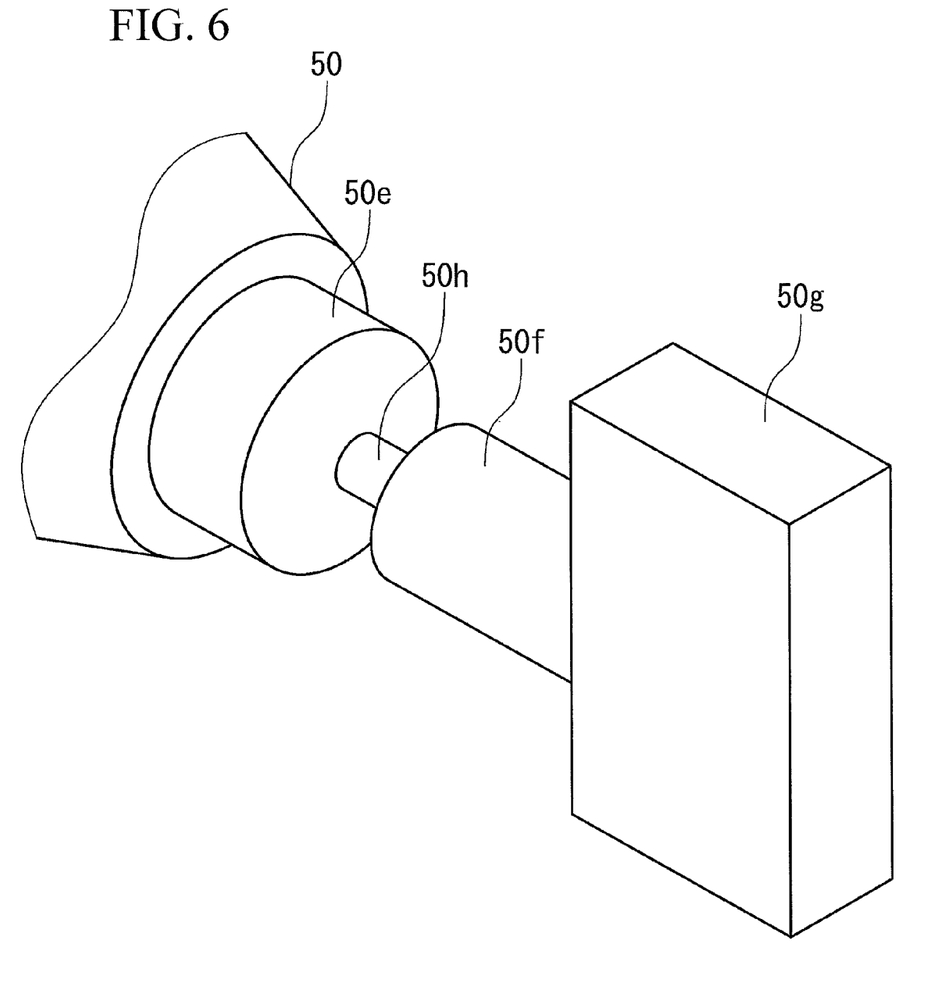
FIG. 6 is a view showing an example of providing a knob portion at the head portion of the cap.

In addition, as shown in FIG. 6, a knob portion 50g in an arbitrary shape can be formed for the head portion 50e of the head cap 50 via a rod portion 50f having a predetermined outside diameter. In such a constitution, a worker attaches the head cap 50 to the fastener member 24 by turning the knob portion 50g. At this time, a part 50h of the rod portion 50f may be set at such strength that the part 50h can be twisted off when the torque reaches the previously specified fastening torque of the head cap 50, by making the part 50h of the rod portion 50f thin, for example. Thereby, the worker can reliably fasten the head cap 50 with the specified torque and attach the head cap 50.

As described above, the head portion 25b of the fastener main body 25 is equipped with the head cap 50, and the shaft portion 25s of the fastener main body 25 is equipped with the shaft cap 30, whereby a direct strike of lightning to the fastener member 24, and occurrence of an arc discharge from the fastener member 24 in the case of a lightning strike are suppressed, and lightning resistance can be enhanced.

Further, the hole 52 is formed in the head cap 50, and the thread groove 52a is formed in the hole 52, whereby the head cap 50 can be easily and reliably positioned and attached to the fastener member 24, and the head cap 50 can be reliably prevented from falling off after being attached.

Further, after the head cap 50 is screwed into the fastener member 24, it is not necessary to wait for curing of the sealant agent 54, and attachment of the head cap 50 can be rapidly performed. Thereby, besides reliably securing lightning resistance, workability is improved, the manufacturing cost is suppressed, and the head cap 50 can be attached with stable quality irrespective of a worker.

Further, if the head cap 50 is made of a resin, mass production is facilitated, the manufacturing cost is suppressed, the thickness is easily controlled by mass production, and the weight of the head cap 50 can be reduced.

Incidentally, the head cap 50 as described above can be formed by cutting, but is preferably formed by injection molding when mass productivity is taken into consideration. In the case of injection molding, it is difficult to form the thread groove 52a of the hole 52 (after formation, the head cap 50 needs to be rotated and removed), and therefore, the thread groove 52a may be attached by screwing a helical coil wire screw thread insert into the hole 52.

In the above described embodiment, the excessive amount of the sealant agent 54 filled inside the hole 52 is forced out by forming the groove 53 in the hole 52, but the present invention is not limited to this. For example, a through-hole is formed in the head cap 50, and the excessive amount of the sealant agent 54 can be forced outside of the head cap 50 from the through-hole.

Further, in the above described embodiment, the head cap 50 is screwed into the thread groove 60a of the boss 60 formed in the head portion 25b of the fastener main body 25 of the fastener member 24, but the other different constitutions can be adopted.

Figure 7A:
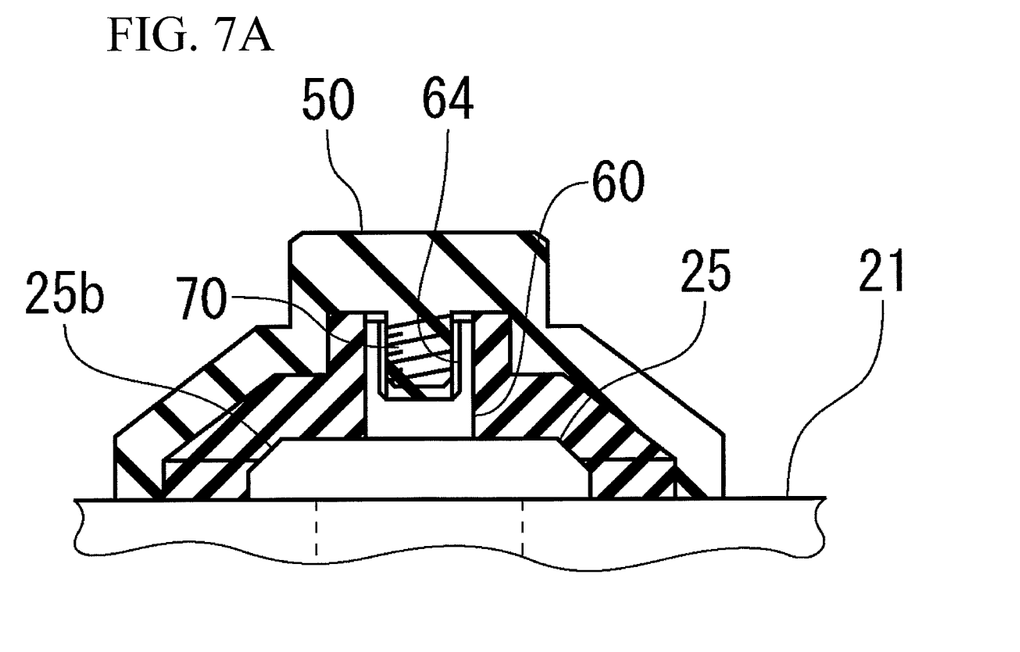
FIGS. 7A and 7B are sectional views showing other examples of the cap.

For example, as shown in FIG. 7A, a hole 64 having a thread groove may be formed in the boss 60 of the head portion 25b of the fastener main body 25, a boss 70 having a thread groove may be formed to project at the inner peripheral surface of the head cap 50. Then, by screwing the boss 70 into the hole 64, the head cap 50 can be attached to the head portion 25b of the fastener main body 25.

Figure 7B:
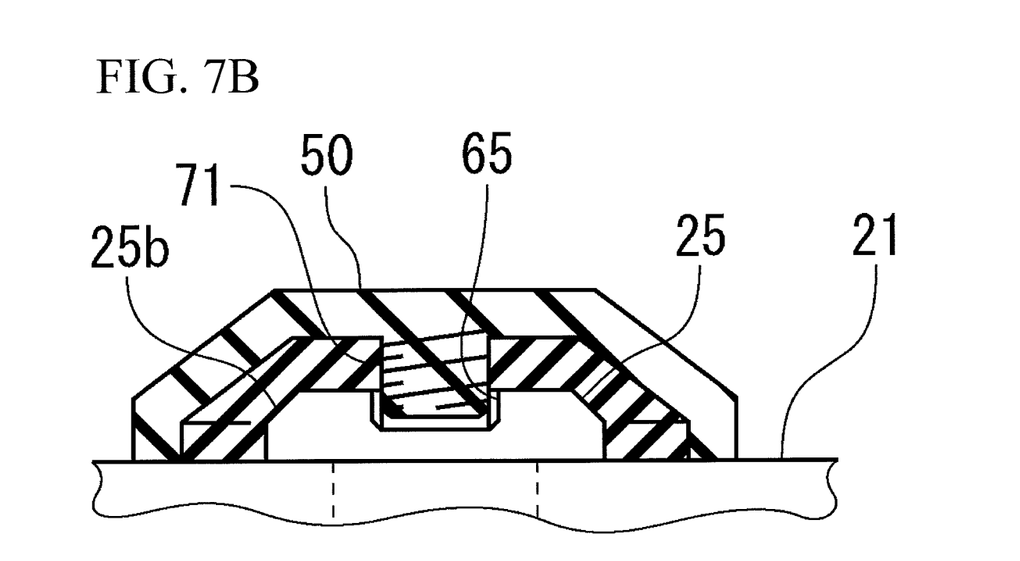

Further, as shown in FIG. 7B, a hole 65 having a thread groove 64a is formed in the top surface of the head portion 25b instead of providing the boss 60 at the head portion 25b, and a boss (engaged portion) 71 having a thread groove 71a may be provided at the inner peripheral surface of the top portion of the head cap 50. Thereby, the height of the head portion 25b of the fastener main body 25 and the head cap 50 can be suppressed.

Figure 8A:
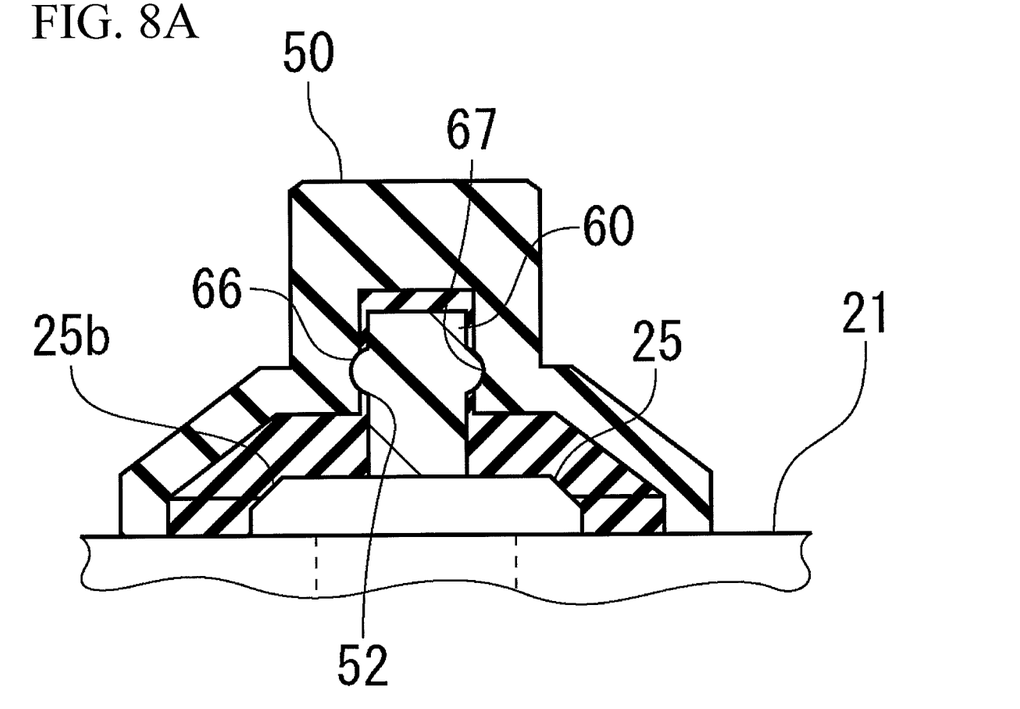
FIGS. 8A and 8B are sectional views showing still other examples of the cap.

Further, as shown in FIG. 8A, the constitution can be adopted, in which while a groove or protruding ridge 66 continuing in the circumferential direction is formed on the outer peripheral surface of the boss 60, a protruding ridge or groove 67 which is fitted in or on the groove or protruding ridge 66 is formed in the hole 52 of the head cap 50, and the groove or protruding ridge 66 and the protruding ridge or groove 67 are fitted to each other, whereby the head cap 50 is attached to the fastener main body 25.

Figure 8B:
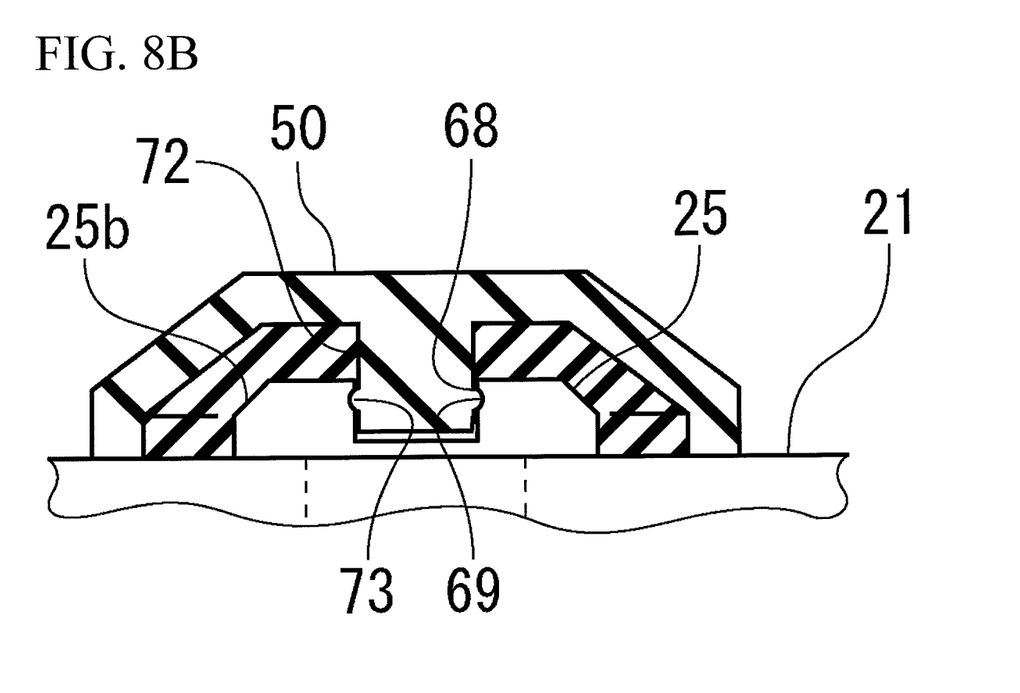

As shown in FIG. 8B, the constitution can be adopted, in which a hole 68 is formed in the top surface of the head portion 25b of the fastener main body 25, a boss (engaged portion) 72 is provided at the head cap 50, and the hole 68 and boss 72 are fitted to each other by fitting of a groove or protruding ridge 73, and a protruding ridge or groove 69, whereby the head cap 50 is attached to the fastener main body 25.

On the side of the shaft portion 25s of the fastener main body 25, the constitution is adopted, in which lightning resistance is secured by putting the shaft cap 30 on the shaft portion 25s, and its specific constitution may be of any other mode, and in any case, the same effect as the above description can be obtained by including the head cap 50 with the constitution as described above on the side of the head portion 25b of the fastener main body 25.

Other than this, the configurations cited in the above described embodiment can be selected, and can be arbitrarily changed to the other configurations without departing from the gist of the present invention.

Reference Signs List
20: airframe composing member
21: first member
22: second member
24: fastener member
25: fastener main body
25a: thread groove (second engaging portion)
25b: head portion
25s: shaft portion
26: collar
28: washer
30: shaft cap (first cap)
30a, 50a: one end portion
30b, 50b: other end portion
32: hole (second engaged portion)
33, 53: groove
34, 54: sealant agent
36, 56: inner peripheral surface
50: head cap (second cap)
52: hole (engaged portion)
55: projection
60: boss (engaging portion)
64: hole
70, 71, 72: boss (engaged portion)

What is claimed is:

1. A lightning-resistant fastener, comprising:
a fastener member for fastening a second member to a first member composing an airframe of an aircraft, the fastener member has a shaft portion penetrating through said first member and said second member from a side of said first member to project to a side of said second member;
a first cap which is attached to cover the shaft portion of said fastener member projected to the side of said second member, and is made of an insulating material; and
a second cap which is attached to cover a head portion of said fastener member on the side of said first member, and is made of an insulating material,
wherein in said head portion of said fastener member, an engaging portion with which said second cap is engaged is formed on the side away from said first member, and
said second cap has an engaged portion formed in a center portion on an inner peripheral surface thereof, and said engaged portion is engaged with said engaging portion,
said second cap is attached to the fastener member in a state in which said engaged portion is engaged with said engaging portion while a gap is provided between said fastener member and a portion of said second cap other than said engaged portion.

2. The lightning-resistant fastener according to claim 1, wherein a second engaging portion is formed on the shaft portion of said fastener member,
said first cap has a second engaged portion formed in a center portion of an inner peripheral surface thereof, and which is engaged with said second engaging portion of said fastener member,
said first cap is attached in a state in which the said second engaging portion of said fastener member is engaged with said second engaged portion while a gap is provided between said fastener member and a portion of said first cap other than said second engaged portion.

3. The lightning-resistant fastener according to claim 1, wherein an insulating sealant agent is filled in said gap.

4. The lightning-resistant fastener according to claim 3, wherein a groove along a direction away from said first member is formed in said engaged portion or said engaging portion.

5. The lightning-resistant fastener according to claim 1, wherein when said engaged portion and said engaging portion are engaged with each other by a screwing method, a head portion of said second cap has a shape on which a tool for screwing said second cap into said fastener member can be laid.

6. The lightning-resistant fastener according to claim 1, wherein anti-slip work is applied onto an outer peripheral surface of said second cap.

7. The lightning-resistant fastener according to claim 1, when said engaged portion and said engaging portion are engaged with each other by a screwing method, a knob portion for a worker to turn said second cap manually is formed to project at said second cap.

8. The lightning-resistant fastener according to claim 7, wherein said knob portion is connected to said second cap via a connecting portion, and said connecting portion is twisted off when said second cap is screwed into the shaft portion of said fastener member by pinching said knob portion, and fastening torque thereof reaches a predetermined level.

9. The lightning-resistant fastener according to claim 1, wherein an inside diameter of said inner peripheral surface of said second cap gradually decreases toward a side where said engaged portion is formed from an opening end side opposite from the side where said engaged portion is formed.

10. The lightning-resistant fastener according to claim 9, wherein in said opening end side of said second cap, a thickness of said sealant agent in a direction of a diameter of said second cap is set at a predetermined dimension or more.

11. The lightning-resistant fastener according to claim 1, wherein adhesive strength between said second cap and said sealant agent is smaller than adhesive strength between said sealant agent and said fastener member.

12. A cap with an umbrella-shape that is fitted onto a head portion of a fastener member which fastens a first member and a second member,
wherein said cap is made of an insulating material and umbrella-shaped,
said cap has an engaged portion on an inner peripheral surface of a top portion of the cap, said engaged portion is engaged with said head portion of said fastener member on the side of said first member, and
said inner peripheral surface is formed so as to be in a state in which said engaged portion is engaged with said head portion of said fastener member while a gap is provided between said fastener member and a portion of said cap other than said engaged portion.

13. A fastener member that is made of a conductive material for fastening a second member to a first member composing an airframe of an aircraft, comprising:
a shaft portion which penetrates through said first member and said second member from a side of said first member, and projects to a side of said second member,
a head portion which has a diameter larger than said shaft portion and is exposed to the side of said first member, and
an engaging portion for attaching a cap made of an insulating material to said head portion to cover the head portion of the fastener member, wherein said engaging portion comprises a boss projected to a side away from said first member, and any one of a thread groove, a groove continuing in a circumferential direction and a protruded ridge, which are formed on an outer peripheral surface of said boss.

14. A method for attaching a lightning-resistant fastener, comprising the steps of:

causing a shaft portion of a fastener main body to penetrate through a first member and a second member from a side of said first member in a state in which the first member composing an airframe of an aircraft and a second member are laid on each other;

fitting a fixing metal fixture to said shaft portion of said fastener main body from a side of said second member;

attaching a first cap to cover said shaft portion of said fastener main body and said fixing metal fixture, on the side of said second member; and attaching a second cap to a head portion of said fastener main body, on the side of said first member, the method further comprising the step of:

filling a sealant agent formed from an insulating material in inner peripheral sides of said first and second caps prior to attaching said first and said second caps to said fastener main body.

* * * * *